United States Patent [19]

Miller

[11] Patent Number: 4,488,235
[45] Date of Patent: Dec. 11, 1984

[54] SPEED CONTROL SYSTEM FOR AIRCRAFT

[75] Inventor: Harry Miller, Scottsdale, Ariz.

[73] Assignee: Sperry Corporation, New York, N.Y.

[21] Appl. No.: 317,823

[22] Filed: Nov. 3, 1981

[51] Int. Cl.³ ............................ G05D 1/08; G06G 7/66
[52] U.S. Cl. ................................ 364/433; 364/434; 364/435; 364/431.01; 244/181; 244/182
[58] Field of Search ............. 364/433, 607, 718, 434, 364/435, 446, 441, 443; 244/181, 182, 180, 193; 318/584

[56] References Cited

U.S. PATENT DOCUMENTS

| | | | |
|---|---|---|---|
| 3,752,967 | 8/1973 | Victor | 244/181 |
| 3,860,800 | 1/1975 | Simpson | 364/433 |
| 3,967,799 | 7/1976 | Muller | 244/181 |
| 4,019,702 | 4/1977 | Annin | 364/433 |
| 4,093,158 | 6/1978 | Clews et al. | 244/181 |
| 4,357,663 | 11/1982 | Robbins et al. | 244/181 |

Primary Examiner—Errol A. Krass
Assistant Examiner—Thomas G. Black
Attorney, Agent, or Firm—Howard P. Terry

[57] ABSTRACT

Speed control apparatus for use in an aircraft performance management system of the type wherein a target Mach number command is supplied to the aircraft pitch controls to attain the target Mach and is simultaneously supplied to the aircraft throttles to capture a computed engine pressure ratio (EPR) or fan speed ($N_1$), said apparatus being operative during maximum thrust climbs and minimum thrust descents upon an abrupt step function target Mach number command wherein said step function command is converted to a ramp command, the slope of which is directly proportional to the existing thrust-minus-drag conditions of the aircraft and inversely proportional to its existing weight, thus ensuring a proper division between aircraft acceleration and rate of climb or aircraft deceleration and rate of descent.

12 Claims, 5 Drawing Figures

SPEED CONTROL SYSTEM FOR AIRCRAFT

BACKGROUND OF THE INVENTION

The present invention relates generally to aircraft control systems and more particularly to aircraft performance management systems for controlling the aircraft vertical flight profile through the coordinated operation of the engine throttles and pitch attitude to thereby provide the most cost effective operation of the aircraft.

Most modern commercial transport aircraft, many general aviation aircraft and certain military aircraft include automatic flight control systems and/or flight director systems, for controlling the aircraft attitude and flight path as well as automatic throttle control systems for controlling aircraft thrust. For many years these two systems have been operated more or less independently or coordinated only during certain phases of flight, such as for example during take-off and landing operations the primary consideration being aircraft controllability and safety rather than operating costs. However, in view of the more recent substantial increases in fuel costs, aircraft operators are very desirous of increasing fuel efficiencies throughout the entire vertical flight profile of their flight plans by assuring the most cost effective operations possible. Coordination between the automatic throttle controls and the automatic pitch attitude flight controls have been carefully analyzed in attempts to achieve these results. Recently developed systems, resulting in this coordinated automatic thrust/attitude control for aircraft have been termed flight management or performance management systems. In general, such systems compute and control thrust and pitch parameters to achieve minimum fuel consumption with the constraints of scheduled trip time between the start of the take-off run to touchdown at the destination. A particular objective of such systems is to obtain smooth, stable and accurate control when the automatic system commands the aircraft to accelerate, decelerate or change its flight path in the vertical plane. In one such system as disclosed in the present inventor's copending U.S. patent application Ser. No. 332,901, filed Dec. 21, 1981 and entitled "Cruise Speed Control for Aircraft Performance Management System", also assigned to the present assignee, a desired and usually automatically commanded airspeed, usually expressed in terms of Mach number and hereinafter designated as Mach target ($M_{TGT}$), is applied to both the automatic throttle control system and to the pitch channel of the automatic pilot and/or flight director system. The $M_{TGT}$ signal to the auto-throttle is used to compute and establish a corresponding engine pressure ratio (EPR) or engine fan speed ($N_1$) while the same $M_{TGT}$ signal to the autopilot is used to pitch the aircraft so as to capture the targeted or commanded Mach speed.

One area of particular concern which prior to such automated systems have been primarily under pilot manual control is the several speed changes which are required by the particular aircraft's characteristics, by an airline's normal operating procedures, by federal regulations and local authorities, at various stages of a flight. Such speed changes occur at the start of second segment climb after take-off, when accelerating to flap retraction speed, when accelerating to 250 KIAS at 3000 feet and when accelerating from the 250 knots requirement below 10,000 feet, flight level 100 (FL100), to optimum climb speed. Other requirements involve particular requirements of Air Traffic Control (ATC). Also, similar deceleration restraints and procedures may be placed on the aircraft during descent from cruise altitude.

Prior to transitioning from the 250 KIAS at FL100 to optimum climb KIAS, for example, the engines are usually set at maximum climb thrust, that is, at the EPR limit values recommended by the aircraft and engine manufacturers. These limit values are variable and are calculated from such existing conditions as inlet air temperature, pressure altitude and the state of various engine bleeds, to provide a corresponding maximum thrust. In general, a desired airspeed may be captured and maintained by controlling pitch attitude. If the aircraft is climbing out at a pitch attitude that will maintain the required airspeed of 250 knots and it is required that the aircraft accelerate to a more economical speed as it passes through 10,000 feet, the performance management system commands (or the pilot selects) an airspeed change from 250 knots to a typical value of 300 knots. If this commanded change is inserted into the pitch controls as a step function, or substantially a step function, the aircraft may nose over excessively and actually dive in its attempt to capture the commanded airspeed. It is desired not be permit such excessive maneuver but rather to proportion acceleration and vertical speed in an adaptive manner to achieve a reasonable rate of climb since low rates of climb for the existing thrust, drag and weight conditions are wasteful of fuel due to the higher fuel consumption of the engines during low altitude operations. Known prior art performance management systems establish some predetermined small climb rate, such as, for example, 500 feet per minute during accelerating climb. This arbitrary climb rate is optimum for only low excess thrust over drag and high aircraft weight and, hence, fuel economy is compromised for other conditions.

SUMMARY OF THE PRESENT INVENTION

The present invention provides a system for assuring that a commanded change in airspeed during climb (or minimum thrust let down) will result in an adaptive ratio of controlled aircraft acceleration to vertical speed under all normal aircraft operating conditions. This is accomplished by converting the step function speed change command to a controlled ramp function acceleration command, the slope of which is directly proportional to the thrust-minus-drag conditions of the aircraft and inversely proportional to its weight.

DESCRIPTION OF THE PREFERRED EMBODIMENT

Figure 1:
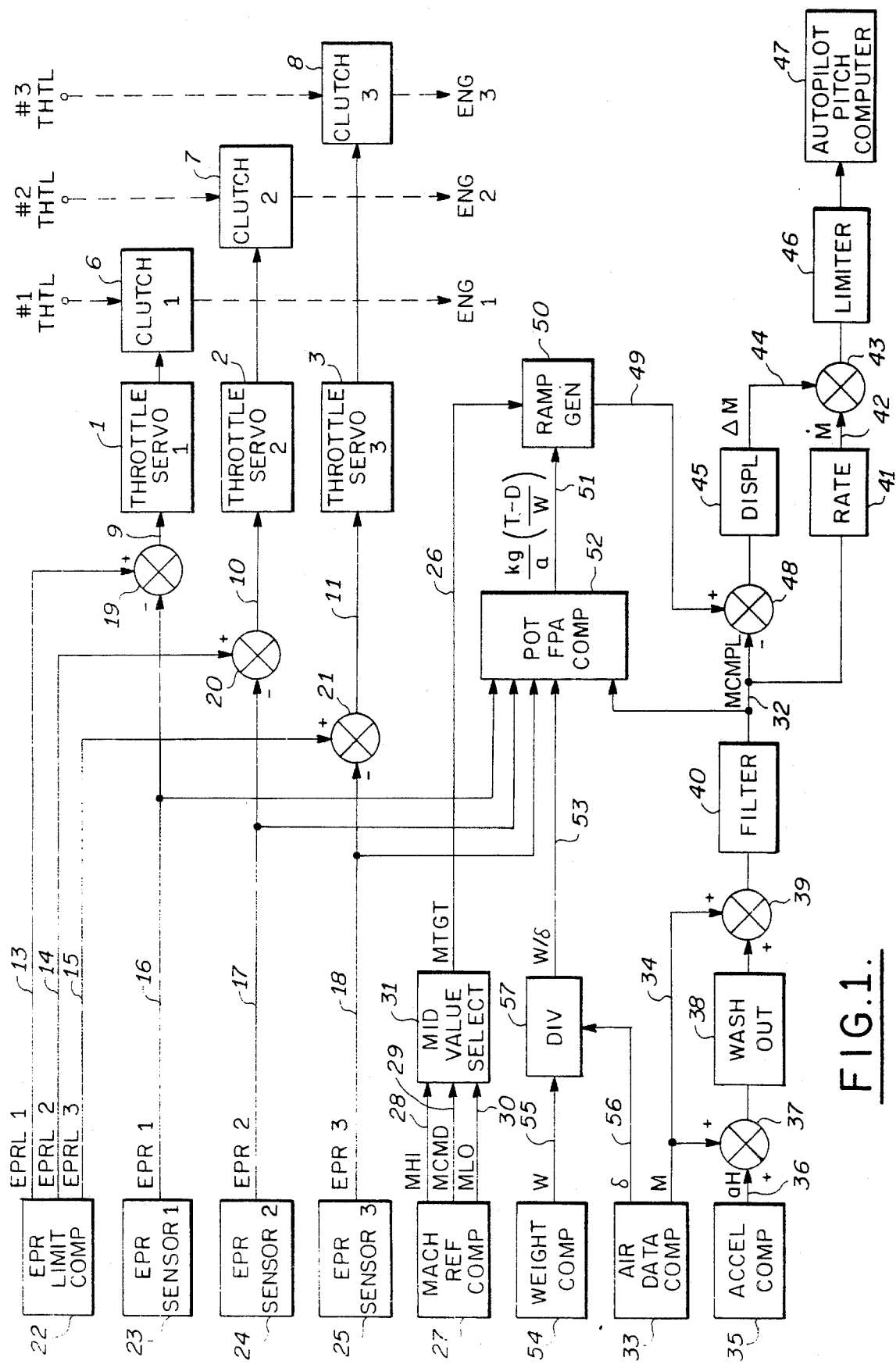
FIG. 1 of the drawings illustrates a preferred implementation of the present invention and constitutes a maximum thrust climb (or idle thrust dive) control mode of operation of a complete aircraft performance management system.

Before discussing the preferred embodiment of the present invention as illustrated in the drawing, it will be helpful in its understanding to discuss its mathematical basis.

As stated heretofore, the basic principle of the invention is to convert a step function airspeed or Mach command or target to the pitch channel of the autopilot or flight director into a ramp function command, the slope of which will provide a predetermined rate of change in Mach number, i.e., a controlled acceleration, which in turn is directly proportional to the thrust (T) minus drag (D) conditions of the aircraft and inversely proportional to its weight (W). Thrust minus drag divided by weight is also known in the art as potential flight path angle, $\gamma$ p. Thus:

$$\sin \gamma p = \frac{T-D}{W} = \frac{\dot{V}}{g} + \sin \gamma = \frac{\dot{V}}{g} + \frac{\dot{h}}{V} \tag{1}$$

Where
T = Thrust
D = Drag
W = Weight
$\dot{V}$ = Forward acceleration
$\gamma$ = Actual flight path angle
$\dot{h}$ = Vertical speed (rate of climb)
V = Forward speed
g = Acceleration of gravity As stated, the purpose of the ramp function is to change the Mach command or target $M_{TGT}$ at a rate which is proportional to the potential flight path angle, that is $$\dot{M} = \left(\frac{g}{a}\right) k \sin \gamma p \tag{2}$$

where k is less than unity and represents the preset fraction of $\gamma$ p above referred to. The value of k will determine the ratio between the last two terms of relationship (1), that is, the ratio between forward acceleration and vertical speed since Mach rate is very nearly proportional to forward acceleration:

$$\dot{M} = \frac{\dot{V} - \dot{M}a}{a} \tag{3}$$

where a equals speed of sound which varies with air temperature and pressure altitude. Since the speed of sound varies only 0.35%/1000 feet of pressure altitude, it can be considered a constant for purposes of the present invention.

As stated, the value of k determines the ratio between forward acceleration ($\dot{V}/g$) and vertical speed ($\dot{h}$) during a controlled speed change or acceleration while the aircraft is climbing at maximum allowable thrust. Thus, from relationships (1) and (3) the following equations may be derived:

$$\frac{\dot{V}}{g} = k\left(\frac{T-D}{W}\right) = \left(\frac{a}{g}\right)\dot{M} \tag{4}$$

$$\dot{h} = V(1-k)\left(\frac{T-D}{W}\right) \tag{5}$$

$$\dot{M} = \left(\frac{g}{a}\right) k\left(\frac{T-D}{W}\right) \tag{6}$$

Since the aircraft is climbing, the thrust exceeds the drag. Therefore, inspection of equation (5) reveals that the value of k must be less than unity if the aircraft is to maintain a positive vertical speed. It is also apparent from equation (6) that $\dot{M}$ will be positive when (T−D)/W is positive. Furthermore, these equations are also valid for step function commands for reduced Mach targets, that is, for descents as well as for climbs, because under such conditions drag exceeds thrust and, hence, (T−D)/W is negative and when k is less than unity, both vertical speed and Mach number are decreasing values, which is desirable for descents.

Thus, the adaptive $M_{TGT}$ command of the present invention results in an automatic adjustment of the magnitudes of the forward acceleration and vertical speed for both climbing acceleration step command maneuvers and descending deceleration step command maneuvers.

A preferred embodiment of the invention is illustrated in block diagram format in FIG. 1. The actual implementation of the block diagram may include standard and readily available commercial devices suitable for the purposes indicated. Summing junctions and functional blocks may be implemented using standard analog devices and circuits such as operation amplifiers configured to perform the computing, summing, logic and limiting functions described. Similarly, the mathematical and logic functions may be implemented in a conventional general purpose digital computer conventionally programmed to perform the described functions. Furthermore, many of the basic elements and computations have already been disclosed by the present inventor and/or his present assignee in issued patents, as well as in copending applications which will be referred to where applicable. The figure covers a three-engine configuration using an individual throttle channel for each engine. It should be understood, of course, that the invention is applicable to two- and four-engine aircraft having corresponding servo channels.

Figure 3:
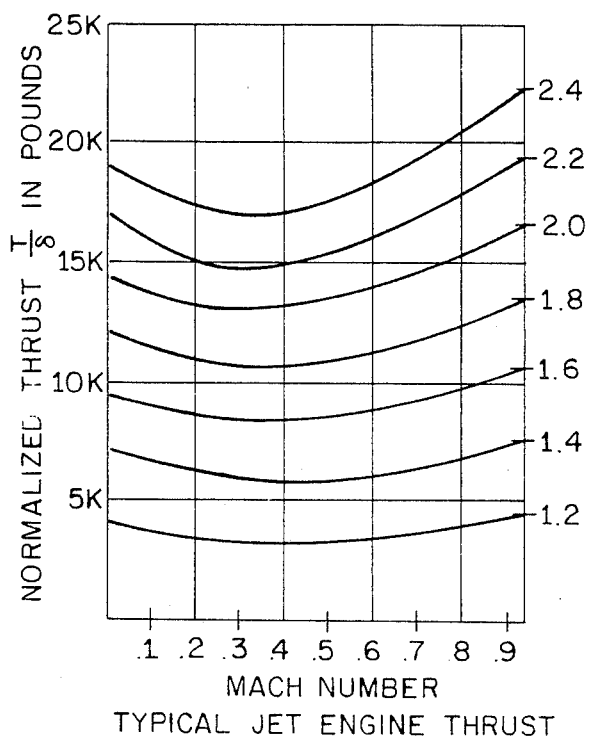
FIGS. 3 and 4 are curves used to derive the thrust and drag terms of the computer of FIG. 2.

A typical channel comprises a conventional throttle servo 1 which operates the fuel control for engine 1 through a no-back mechanism 6 such as that disclosed in the present inventor's U.S. Pat. No. 3,505,912 also assigned to the present assignee. The input signal to servo 1 on lead 9 is the difference between the signal on lead 13 and that on lead 16 through summing junction 19, where the lead 13 signal is generated in EPR limit computer 22 and the lead 16 signal is the actual EPR of engine 1 as detected by EPR sensor 23. The EPR limit computer 22 is entirely conventional and establishes the maximum EPR at which the engines can safely operate under existing ambient temperature, atmospheric pressure, etc., as established by the engine and aircraft manufacturer. The actual EPR sensor 23 is also conventional. As is well known, the value of EPR combining with Mach number and static pressure is a measure of the thrust being provided by the engine. The characteristics of EPR as a measure of engine thrust is illustrated in FIG. 3 and is discussed in more detail in the present inventor's U.S. Pat. No. 4,110,605 also assigned to the present assignee. The channel for engines 2 and 3 are similar comprising elements 2, 7, 10, 14, 17, 20, 22 and 24 and elements 3, 8, 11, 15, 18, 21, 22 and 25, respectively. In those aircraft throttle control systems using a single throttle servo operating through ganged clutches, the three EPR error signals from summers 19, 20 and 21 are summed and the average value thereof is used to drive the single throttle servo. The implementation of the present invention used to couple the speed command to the autopilot or flight director pitch axis is identical for either throttle control configuration.

A Mach target signal on lead 26 may be generated in Mach reference computer 27. This computer may be any conventional apparatus for providing a desired airspeed command. It may be that part of a performance management system which automatically supplies preprogrammed airspeed or Mach command values at predetermined points in a preestablished flight plan dependent upon operation conditions. For example, the performance management system may supply a change of airspeed command from 250 KIAS to 300 KIAS when the aircraft reaches 10,000 feet as measured by the air data computer 33 through conventional mode switching logic. Alternatively, the Mach reference computer 27 may simply be an airspeed or Mach number selector with a visual readout which the pilot may use to set to the desired value of airspeed or Mach number. An example of a simple selector is described in the present inventor's U.S. Pat. No. 3,522,729 also assigned to the present assignee. In either case, it is preferable that three values of the reference Mach number be supplied; a Mach reference command on lead 29 and a corresponding high limit value on lead 28 and a low limit value on lead 30, those signals being supplied to conventional mid-value logic 31 which selects the mid-value thereof as the Mach reference or Mach target command on lead 26. The high and low Mach values are predetermined not-to-exceed values and provide buffet protection. The mid-value selector assures that the speed command system operates between these limit values.

The aircraft actual or existing Mach number speed signal on lead 32 is a conventionally complemented signal, the steady state and low frequency components of which are derived from a Mach speed signal on lead 34 from a conventional air data computer 33 and the high frequency components of which are derived from a fore-and aft acceleration computer 35, which may derive its primary signal from a fore-and-aft accelerometer, for example. Such complementary filter techniques are further disclosed in the present applicant's U.S. Pat. No. 3,691,356 assigned to the assignee hereof. The air data computer Mach signal and the accelerometer computer signal are summed at 37 and washed out by washout filter 38, the output of which is resummed with the air data Mach signal at 39 whose output is smoothed through filter 40. Thus, the actual Mach number signal on lead 32 provides a smooth and lag-free measure of the actual Mach number speed, $M_{CMPL}$, of the aircraft. In accordance with the present invention, this signal is supplied to the pitch computer channel of the autopilot, represented by the block 47 in this embodiment, through a summing network 48 and a displacement gain adjust 45. In order to provide overall Mach control system stability, a Mach number rate signal is derived through rate taking element 41 which signal is combined with the displacement signal on lead 44 through summer 43. For safety purposes and to prevent excessive pitch attitude commands to the autopilot 47, the Mach signal is limited at limiter 46.

The Mach number command or $M_{TGT}$ signals on lead 26 is applied, through ramp generator 50 to be described below, to the summing junction 48. Thus, the summing junction 48 compares the value of the Mach command signal with the actual Mach signal on lead 32 to thereby generate a difference Mach signal the value of which represents the error between the commanded and actual Mach number speeds, $\Delta M$. This error then becomes the displacement command to the autopilot which alters the aircraft pitch attitude which in turn alters the aircraft Mach speed (since the thrust is constant) until the actual Mach speed matches that commanded thereby reducing the error to zero.

As stated above, if the March command, being essentially a step function, is applied directly and unaltered to the summing junction 48 the error signal on lead 44 is likewise essentially a step function. Therefore, in order to satisfy this command, the aircraft will immediately pitch down and probably actually execute a diving maneuver before it can achieve the acceleration to capture the commanded Mach speed. In other words the step Mach error results in an uncontrolled acceleration of the aircraft in response to the command and results in a very undesirable maneuver.

Thus, and in accordance with the present invention, the step command signal is converted to a controlled ramp signal which will result in a correspondingly controlled pitch change which in turn will result in a correspondingly controlled acceleration, that is, a rate of change of Mach number. The slope of the ramp signal is represented by equation (6) above and its generation will now be described.

As described above, the solution for equation (6) requires fixed signals corresponding to the fixed quantities g, a and k and variable signals corresponding to the variable quantities T, D and W. The weight term W is obtained from weight computer 54. This computer may be of any conventional type one of which is that disclosed in the above U.S. Pat. No. 4,110,605. Another type may be that disclosed in the present inventor's copending U.S. patent application Ser. No. 333,097, filed Dec. 21, 1981, entitled "En route Weight Computer for Aircraft" also assigned to the present assignee. The output signal of the weight computer 54 appears on lead 55 and is supplied to a divider element 57 where it is divided by a signal corresponding to the existing pressure or static altitude $\delta$ to provide the W/$\delta$ signal on lead 53. The pressure altitude signal $\delta$ is provided by the air data computer 33.

Figure 2:
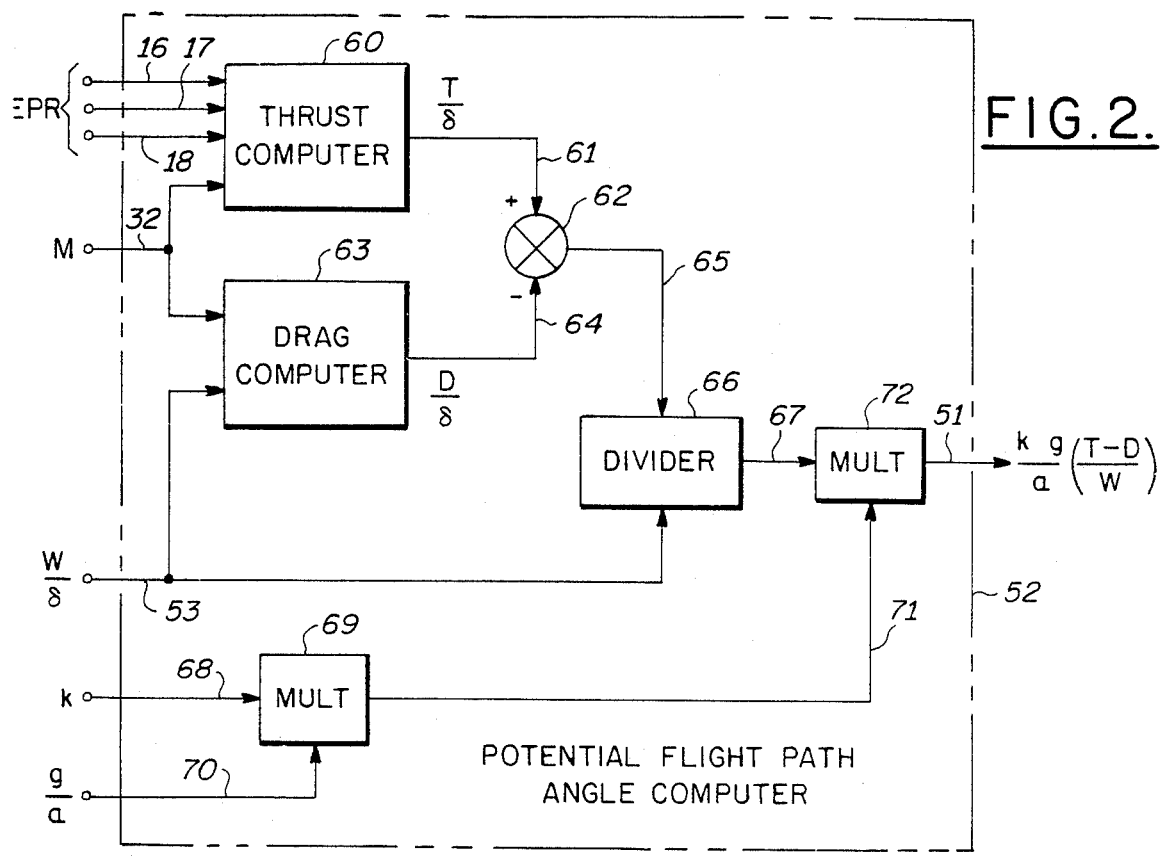
FIG. 2 illustrates a preferred implementation of the potential flight path angle computer of FIG. 1.

Referring now to FIG. 2, the potential flight path angle computer 52 is illustrated in more detail. In general it includes the computer apparatus required to generate the variables T and D and to perform the multiplication and division functions required. Actually, all three functions T, D and W are derived in the form T/$\delta$, D/$\delta$ and W/$\delta$ where $\delta$ is the ratio of static pressure to standard sea level pressure, since these are the formats used by the aircraft manufacturer in defining these terms. The $\delta$ term will, of course, cancel out in the computation.

Figure 4:
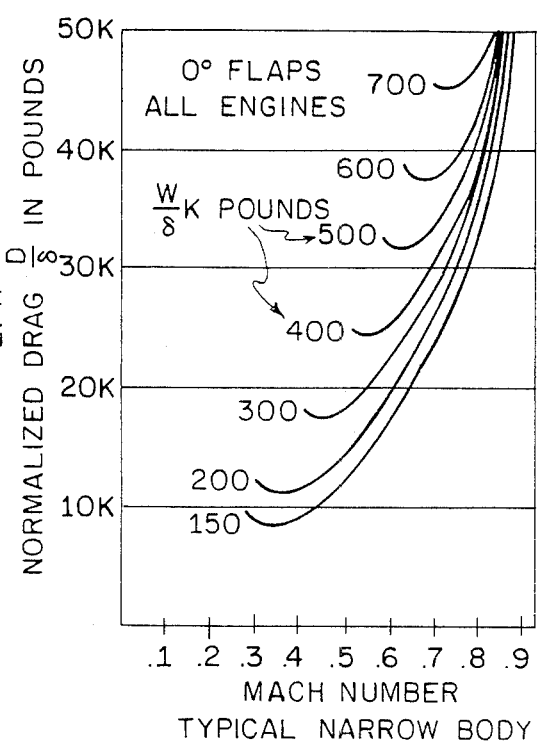

The thrust computer 60 receives measures of the three EPR signals on leads 16, 17 and 18 and the Mach signal on lead 32 and supplies an output proportional to T/$\delta$ on lead 61 which is supplied to summing junction 62. The thrust computer 60 may be of the type illustrated in the above U.S. Pat. No. 4,110,605 and such computation is based on the data illustrated graphically in FIG. 3 which is characteristic of a typical three-engine narrow body jet transport. In a digital implementation of the thrust computer 60, this characteristic data is stored in a non-volatile memory and is conventionally addressed by the average value of the three actual EPR measures and the actual Mach number measure to derive the corresponding thrust output. Similarly, the drag computer 63 receives the Mach measure on lead 32 and the weight data on lead 53 and provides on output lead 64 a signal proportional to D/δ in accordance with the drag characteristic of the aircraft as illustrated in FIG. 4. The output on lead 64 is supplied to summing junction 62 where it is subtracted from the thrust measure on lead 61 to provide on lead 65 a signal proportional to T/δ−D/δ. This difference signal is divided by the W/δ signal on lead 53 in divider 66 to provide on lead 67 the basic term of equation (6) above. Note that the δ term cancels out and does not appear in the output of divider 66.

In accordance with the invention, the system constant k, which determines the ratio between the forward acceleration to the rate of climb, that is, how the amount of excess thrust in the case of a climb (or the amount of excess drag in the case of a descent) is to be divided between forward acceleration and rate of climb, is supplied on input 68 to the computer 52. As stated above, the value of k is greater than zero and less than unity; a typical value which provided good performance is k=0.5, although other values between 0.1 and 0.9 could be used. This signal is multiplied in multiplier 69 by the constant represented by the ratio between the gravity constant g and the speed of sound constant a and supplied on lead 70. The resulting product on lead 71 is supplied to multiplier 72 where the product output signal $$\frac{kg}{a}\left(\frac{T-D}{W}\right)$$

is generated and supplied to output lead 51, all in accordance with equation (6).

Figure 5:
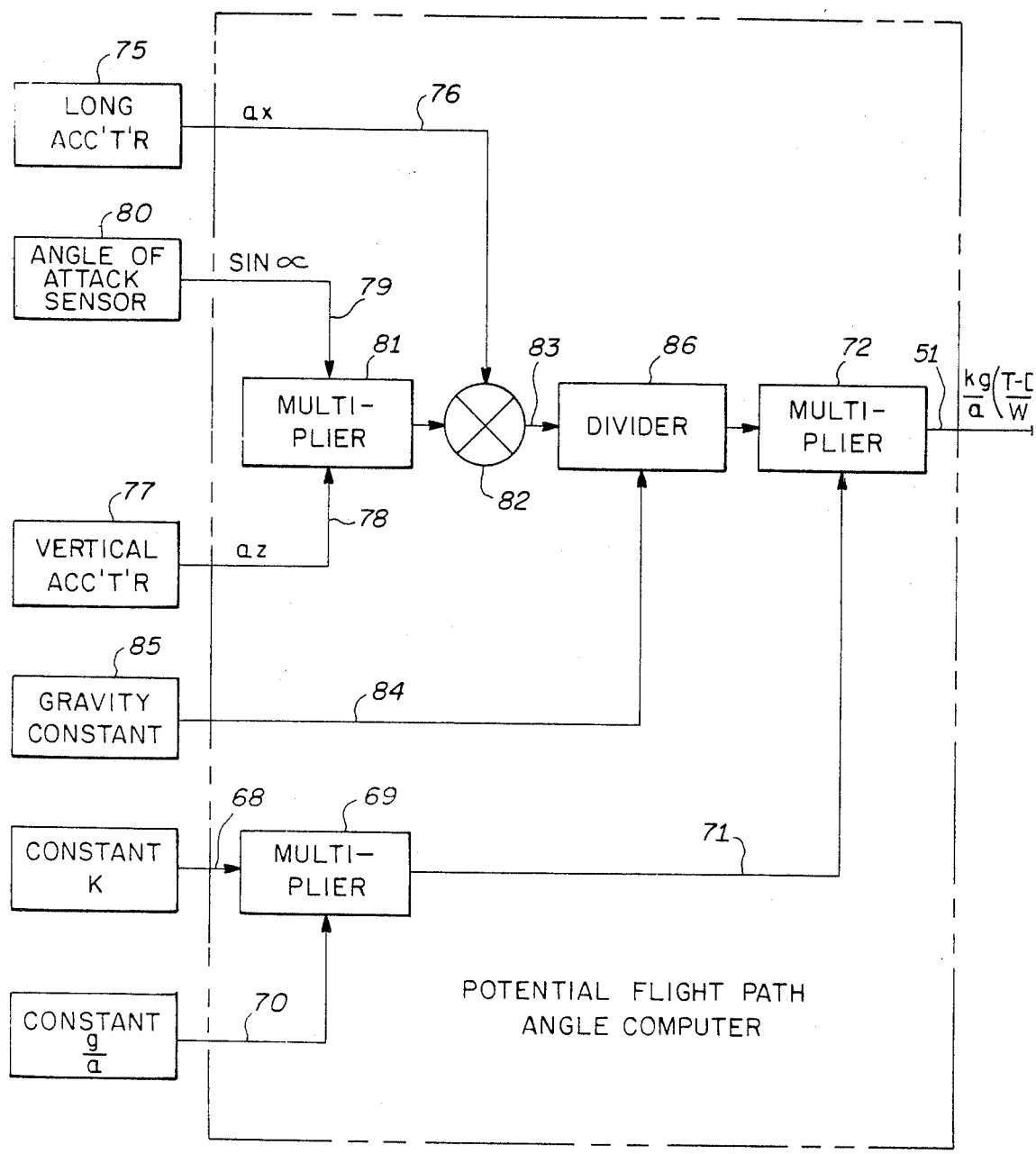
FIG. 5 illustrates an alternate preferred implementation of the potential flight path angle computer of FIG. 1.

The ramp varying potential flight path angle term of equation (6) may be derived in other ways, a preferred one of which is illustrated in FIG. 5. This implementation is preferred because the measurable terms used to generate it are independent of the actual thrust, drag and weight terms used in FIG. 2. The governing relationship is $$\frac{T-D}{W} = \frac{a_x - a_z \sin \alpha}{g} \quad (7)$$

Note that the primary input terms are measures of acceleration forces acting on the aircraft and its angle of attack. Also, note that the exact longitudinal acceleration term is $a_x \cos \alpha$; however, since the angle of attack of the aircraft in the climb modes under consideration is usually small, the cosine term may be considered to be unity. The derivation of equation (7) from aerodynamic forces acting on the aircraft is described in detail in the present inventor's U.S. Pat. No. 3,691,356 and therefore will not be repeated herein.

As shown in FIG. 5, the dynamic terms of equation (7) are generated by sensors normally carried by the aircraft. Longitudinal accelerometer 75 supplies a signal on lead 76 proportional to the acceleration of the aircraft along its longitudinal or X-axis and vertical accelerometer 77 supplies a signal on lead 78 proportional to the acceleration of the aircraft along its vertical axis while a signal on lead 79 proportional to the sine of the aircraft angle of attack is provided from a conventional angle of attack sensor 80. The sensor 80 may comprise a conventional angle of attack vane positioning a conventional electrical resolver such as a synchro resolver. In accordance with equation (7) the vertical acceleration and angle of attack signals are multiplied as by multiplier 81, the product of which is subtracted from the longitudinal acceleration signal as by summing junction 82 to provide the equation numerator on lead 83. The signal on lead 84 proportional to the gravity constant g may be derived from a suitable power supply, schematically indicated at 85, and supplied as the equation denominator to divider 86 which receives the numerator on lead 83. The quotient signal output of divider 86 represents the solution of equation (7) and hence is a signal representing the value of (T−D)/W. The remainder of the apparatus of FIG. 5 is the same as that already described in connection with FIG. 2 and will not be repeated in the interest of brevity.

Returning to FIG. 1, this signal which represents, as described above, the desired slope of the $M_{TGT}$ command to the pitch channel of the autopilot is supplied to a conventional ramp generator 50 for varying the $M_{TGT}$ signal on lead 26, accordingly. An analog ramp generator suitable for this purpose can be of the well known variable pulse width amplifier type as disclosed in U.S. Pat. No. 3,418,490 wherein the pulse width of the $M_{TGT}$ signal is varied from zero or substantially zero to full width in accordance with the ramp signal output on lead 51.

Accordingly, the ramp generator 50 provides on the lead 49 a ramp signal having a slope in accordance with the signal on the lead 51 and terminating when the ramp signal attains the $M_{TGT}$ on the lead 26. The ramp generator 50 may alternatively comprise an integrator that integrates the signal on the lead 51 and a limiter that terminates the ramp when the signal on the lead 49 attains the $M_{TGT}$ value.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Speed command apparatus for aircraft having an automatic throttle control system for controlling the thrust imparted to said aircraft by the aircraft engines and an automatic flight control system for controlling the aircraft pitch attitude, said apparatus comprising:
    (a) means for providing a command signal corresponding to an aircraft speed change from an existing value to a commanded value,
    (b) means responsive to said command signal for providing a ramp signal
    (c) means for supplying said ramp signal to said automatic flight control system for changing the aircraft pitch attitude in accordance therewith, and
    (d) means for controlling the slope of said ramp signal in accordance with the potential flight path angle of said aircraft.

2. The apparatus as set forth in claim 1 wherein said command signal is sustantially a step function command.

3. The apparatus as set forth in claim 1 further including:
   means for controlling said automatic throttle control system in accordance with a signal corresponding to a limit thrust condition of the aircraft engines.

4. The apparatus as set forth in claim 3 wherein said limit thrust signal corresponds to a maximum thrust limit for said engines and wherein said speed command signal requires an increase in speed.

5. The apparatus as set forth in claim 3 wherein said limit thrust signal corresponds to a minimum thrust limit for said engines and wherein said speed command signal requires a decrease in speed.

6. The apparatus as set forth in any one of said claims 1 through 5 further including:
   (a) means for providing a signal corresponding to the actual speed of the aircraft,
   (b) means responsive to said actual speed signal and said ramp signal for providing a resultant speed error signal, and
   (c) means for supplying said speed error signal to said automatic flight control system.

7. The apparatus as set forth in claim 6 further including:
   (a) means responsive to said actual speed signal for supplying a signal corresponding to the rate of change thereof, and
   (b) means for supplying said speed error and said rate of change of actual speed signal to said automatic flight control system.

8. The apparatus as set forth in claim 1 wherein said ramp slope controlling means comprises:
   (a) means for providing a signal corresponding to the longitudinal acceleration of said aircraft,
   (b) means for providing a signal corresponding to the vertical acceleration of the aircraft,
   (c) means for providing a signal corresponding to the angle of attack of the aircraft, and
   (d) means responsive to said last mentioned signals for providing a signal corresponding to the difference between the thrust minus drag divided by the weight of said aircraft.

9. Speed command apparatus for aircraft having an automatic throttle control system for controlling the thrust imparted to said aircraft by the aircraft engines and an automatic flight control system for controlling the aircraft pitch attitude, said apparatus comprising:
   means for providing a command signal corresponding to an aircraft speed change from an existing value to a commanded value,
   means responsive to said command signal for providing a ramp signal,
   means for supplying to said automatic flight control system for changing the aircraft pitch attitude in accordance therewith, and
   means for controlling the slope of said ramp signal in accordance with the potential flight path angle of said aircraft, said ramp slope controlling means further comprising:
   (a) means for providing a signal corresponding to the thrust imparted to said aircraft by said engines,
   (b) means for providing a signal corresponding to the drag of the aircraft,
   (c) means for providing a signal corresponding to the weight of the aircraft, and
   (d) means for providing a ramp slope control signal corresponding to the difference between said thrust and the drag signals divided by said weight signal.

10. Speed command apparatus for aircraft having an automatic throttle control system for controlling the thrust imparted to the aircraft by the aircraft engines and an automatic flight control system for controlling the aircraft pitch attitude, said apparatus comprising:
   (a) means for providing a substantially step function speed command signal corresponding to an aircraft speed change from an existing speed value to a commanded value, and
   (b) means for supplying said command signal speed to said automatic flight control system for changing the aircraft pitch attitude in accordance therewith to thereby change the aircraft speed, said command signal speed supplying means comprising
   (i) means for converting said substantially step function speed command signal to a ramp function having a slope proportional to the potential flight path angle of said aircraft whereby to control the acceleration of said aircraft in capturing said commanded speed value.

11. The apparatus as set forth in claim 10 wherein said converting means includes:
   (a) means for providing a signal corresponding to the thrust imparted to said aircraft by said engines,
   (b) means for providing a signal corresponding to the drag of the aircraft,
   (c) means for providing a signal corresponding to the weight of the aircraft, and
   (d) means for providing a ramp slope control signal corresponding to the difference between said thrust and the drag signals divided by said weight signal.

12. The apparatus as set forth in claim 10 wherein said ramp slope controlling means comprises:
   (a) means for providing a signal corresponding to the longitudinal acceleration of said aircraft,
   (b) means for providing a signal corresponding to the vertical acceleration of the aircraft,
   (c) means for providing a signal corresponding to the angle of attack of the aircraft, and
   (d) means responsive to said last mentioned signals for providing a signal corresponding to the difference between the thrust minus drag divided by the weight of said aircraft.

* * * * *